United States Patent
Dutta et al.

(10) Patent No.: US 11,334,895 B2
(45) Date of Patent: May 17, 2022

(54) METHODS, SYSTEMS, AND APPARATUSES FOR DETECTING MERCHANT CATEGORY CODE SHIFT BEHAVIOR

(71) Applicant: VISA INTERNATIONAL SERVICE ASSOCIATION, San Francisco, CA (US)

(72) Inventors: Arpita Dutta, Bangalore (IN); Shilpi Agrawal, Bangalore (IN); Animesh Tripathy, Bangalore (IN); Prameela Kavya Thummuru, Bangalore (IN); Vijayendra Singh, Bangalore (IN)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 205 days.

(21) Appl. No.: 16/733,834

(22) Filed: Jan. 3, 2020

(65) Prior Publication Data
US 2021/0209601 A1    Jul. 8, 2021

(51) Int. Cl.
*G06Q 20/40*    (2012.01)
*G06F 17/18*    (2006.01)

(52) U.S. Cl.
CPC ......... *G06Q 20/4016* (2013.01); *G06F 17/18* (2013.01)

(58) Field of Classification Search
None
See application file for complete search history.

(56) References Cited

U.S. PATENT DOCUMENTS

| | | | | |
|---|---|---|---|---|
| 8,805,737 B1* | 8/2014 | Chen | ...... | G06Q 40/00 235/380 |
| 2009/0132347 A1* | 5/2009 | Anderson | ...... | G06Q 30/02 705/30 |
| 2010/0306029 A1* | 12/2010 | Jolley | ...... | G06Q 30/0201 705/7.29 |
| 2011/0196791 A1* | 8/2011 | Dominguez | ...... | G06Q 40/00 705/44 |
| 2012/0095819 A1* | 4/2012 | Li | ...... | G06Q 30/02 705/14.23 |
| 2013/0226777 A1* | 8/2013 | Hu | ...... | G06Q 40/02 705/38 |
| 2014/0108166 A1* | 4/2014 | Murphy | ...... | G06Q 30/0213 705/16 |
| 2014/0279306 A1* | 9/2014 | Shi | ...... | G06Q 40/12 705/30 |

(Continued)

*Primary Examiner* — William J Jacob
(74) *Attorney, Agent, or Firm* — Loeb & Loeb LLP

(57) ABSTRACT

A method for detecting merchant category code (MCC) shift behavior is disclosed. A target merchant operating in one or more industries is identified, and a peer set of merchants that operate in the same industries as the target merchant is determined. A first dataset D1 and a second dataset D2 is received. One or more merchant consistency ratios using the first dataset D1 and the second dataset D2 is calculated. An industry ratio for each of the industries and a MCC ratio for the one or more merchants is calculated using the second dataset D2. Whether the target merchant exhibits MCC shift behavior is determined by comparing the merchant consistency ratios to a first threshold, comparing each industry ratio to a second threshold, and comparing the MCC ratio to a third threshold. In response to a determination that the target merchant exhibits MCC shift behavior, an alert is communicated.

19 Claims, 8 Drawing Sheets

(56) References Cited

U.S. PATENT DOCUMENTS

| | | | |
|---|---|---|---|
| 2014/0310159 A1* | 10/2014 | Zoldi | G06Q 20/4016 705/39 |
| 2015/0302405 A1* | 10/2015 | Pastore | G06Q 40/00 705/44 |
| 2016/0086284 A1* | 3/2016 | Ghosh | G06Q 40/08 705/4 |
| 2016/0335641 A1* | 11/2016 | White | G06Q 20/40 |
| 2017/0124574 A1* | 5/2017 | Gerard | G06F 16/9537 |
| 2018/0040073 A1* | 2/2018 | Ghosh | G06Q 20/405 |
| 2019/0019232 A1* | 1/2019 | Joshi | G06Q 30/0613 |
| 2019/0318367 A1* | 10/2019 | Myles | G06Q 10/0637 |
| 2020/0250185 A1* | 8/2020 | Anderson | G06Q 30/01 |
| 2021/0042824 A1* | 2/2021 | Tarler | G06N 20/20 |
| 2021/0192640 A1* | 6/2021 | Rolfs | G06Q 20/4014 |

* cited by examiner

METHODS, SYSTEMS, AND APPARATUSES FOR DETECTING MERCHANT CATEGORY CODE SHIFT BEHAVIOR

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Transaction cards, such as credit and debit cards, have become a preferred method for consumers to pay for goods and services making them an indispensable way for merchants to conduct business. The processing of transaction card payments involves several key players including acquiring banks (a.k.a. acquirers), payment networks, and issuing banks (a.k.a. issuers). At a high level, a merchant provides a payment gateway, such as a point of sale (POS) terminal or a checkout page on its website or mobile app, where consumers can pay for selected goods and/or services using their transaction cards. An acquirer receives transaction data and account information from the merchant's payment gateway, and sends the transaction data, the account information, and an authorization request to an issuer associated with the transaction card via a payment network. The issuer approves or declines the authorization request and transaction amount and such information is sent back to the acquirer via the payment network. If the transaction is approved, funds are transferred from the consumer's account with the issuer and deposited into the merchant's account with the acquirer.

Payment networks, therefore, act as an intermediary for all the various entities involved in an electronic transaction. Payment networks, such as Visa®, MasterCard®, Discover®, and American Express®, obtain revenue in a variety of ways including interchange fees that are obtained from the merchant.

The interchange fee a merchant pays is based on the Merchant Category Code in which it falls, with riskier lines of business paying higher fees. Merchant Category Codes (MCC) are four digit numbers that are used to classify businesses by merchant type (e.g., hotels, gas stations, retail clothing stores, office supply stores, etc.) or by merchant name (e.g., MCC 3000 for United Airlines). For example, a business classified as MCC 5411 for "Grocery Stores, Supermarkets" or MCC 8211 for "Elementary and Secondary Schools" typically qualify for lower than typical interchange fees, whereas higher-risk MCCs, such as 5912 for "Drug Stores, Pharmacies" or MCC 5962 "Direct Marketing—Travel-Related Arrangement Services", generally qualify for higher interchange fees.

Although the primary purpose of a MCC is to determine the interchange fees a merchant pays, the MCC may also be used:
- by credit card companies to offer cash back rewards or reward points, for spending in specific categories;
- by card networks to define rules and restrictions for card transactions (e.g., MCC 5542 for "Automated Fuel Dispensers" have specific rules for authorization and clearing messages); and,
- in the United States, to determine whether a payment is primarily for "services", which may need to be reported by the payor to the Internal Revenue Service for tax purposes or for "merchandise", which may not.

A MCC is assigned to a merchant when it first starts accepting transaction cards as a form of payment and reflects the primary category in which the merchant does business. Acquirers and their agents are required to assign the correct MCC to each of their merchants and update the MCC if the merchant's business changes over time. For example, Amazon.com® was originally registered under the MCC for bookstores, now they operate in more than 100 different MCCs.

To take advantage of lower interchange rates associated with certain MCCs, some merchants change or shift their MCC. MCC shift behavior can occur without having any impact on a merchant's overall transaction volume. For example, if a merchant operates in two MCCs and has a sudden increase in transaction volume in one MCC during a month with significant decrease in transaction volume for the other MCC in the same month, the net effect is little or no change in overall transaction volume for the merchant during the month. Thus, MCC shift behavior often goes undetected and results in the payment processing company losing its proper amount of interchange fees.

In addition, some acquires may incorrectly identify merchants in order to offer lower rates to merchant. Such practices may give these acquirers an unfair competitive advantage over other acquirers that properly classify merchants.

Furthermore, some MCC shift behavior may be legitimate, and over time some MCCs may no longer make sense or be relevant as consumer buying habits shift or change.

Accordingly, there exists a need to establish a model that can effectively detect merchants exhibiting MCC shift behavior to safeguard against the loss of revenue from interchange fees, to correctly classify consumer purchases for reward and tracking purposes, to assist in correctly classifying merchants for tax and other regulatory purposes, and to level the playing field with respect to competing acquirers. In addition, there also exists a need to understand the stability of MCCs.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, a method for detecting merchant category code shift behavior is disclosed. A target merchant operating in one or more industries may be identified. A peer set of merchants that operate in the same one or more industries as the target merchant may be determined. A first dataset D1 may be received. The first dataset D1 may include peer transaction data for all merchants in the peer set of merchants that operate in the one or more industries during a first time period. A second dataset D2 may be received. The second dataset D2 may include merchant transaction data for the target merchant during the first time period. The merchant transaction data may include industry transaction data for the one or more industries in which the target merchant operates. The industry transaction data for the one or more industries may include merchant category code transaction data for one or more merchant category codes. One or more merchant consistency ratios using the first dataset D1 and the second dataset D2 may be calculated. An industry ratio for each of the one or more industries and a merchant category code ratio for the one or more merchants may be calculated using the second dataset D2. Whether the target merchant exhibits merchant category code shift behavior may be determined by comparing the one or more merchant consistency ratios to a first threshold value, comparing each industry ratio to a second threshold value, and comparing the merchant category code ratio to a third threshold value. In response to a determination that the target merchant exhibits merchant category code shift behavior, an alert for the target merchant is communicated.

BRIEF DESCRIPTION OF THE DRAWINGS

The example embodiment(s) of the present disclosure are illustrated by way of example, and not in way by limitation, in the figures of the accompanying drawings and in which like reference numerals refer to similar elements and in which.

The figures depict various embodiments for purposes of illustration only. One skilled in the art may readily recognize from the following discussion that alternative embodiments of the structures and methods illustrated herein may be employed without departing from the principles described herein. For example, other embodiments may omit, add to, reorder, and/or modify any of the elements shown in the figures.

DETAILED DESCRIPTION

At a high level, the systems and methods described herein attempt to identify when a merchant has a shift in MCC behavior which may indicate there is some improper external or internal merchant or acquirer behavior occurring. For example, if a merchant conducts business in two or more MCCs and has a sudden decline in one and a significant increase in another with no significant change in overall transaction volume, that may indicate that the merchant is incorrectly classified in one or more MCCs, that the merchant is seeking to take advantage of lower interchange fees, or that the MCC is no longer relevant. In any case, it may be useful to investigate the reason for the MCC shift behavior at the merchant to determine the source of the change.

Figure 1:
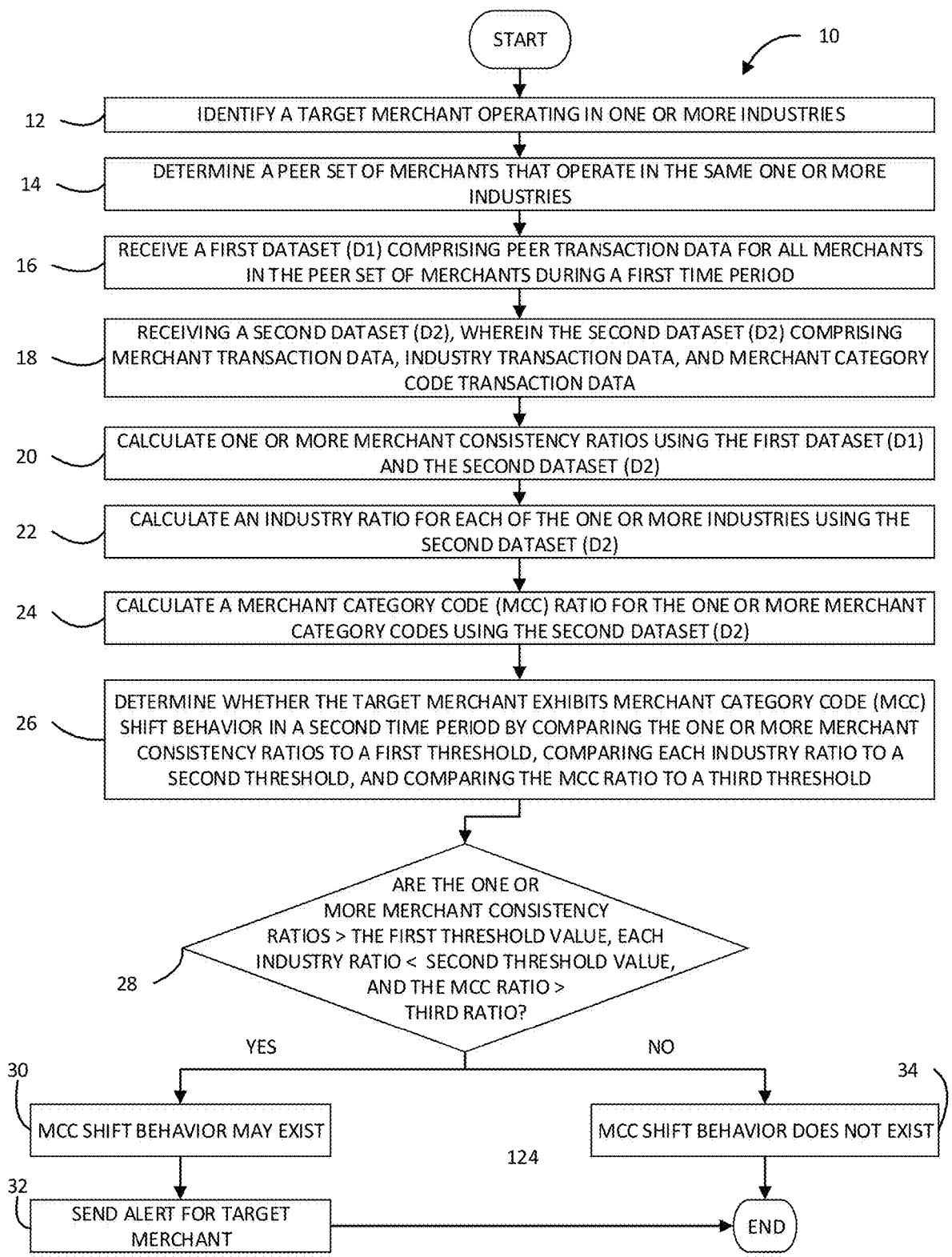
FIG. 1 is a flowchart of an embodiment of a method for detecting merchant category code shift behavior.

FIG. 1 generally illustrates an embodiment of a method 10 for determining whether a merchant is exhibiting MCC shift behavior. At a block 12, a target merchant operating in one or more industries may be identified. At a block 14 a peer set of merchants that operate in the same one or more industries as the target merchant may be determined. A first dataset D1 may be received at a block 16. The first dataset D1 may comprise peer transaction data for all merchants in the peer set of merchants during a first time period. At a block 18 a second dataset D2 may be received. The second dataset D2 may comprise merchant transaction data for the target merchant, industry transaction data, which may include transaction data for the one or more industries in which the target merchant operates, and merchant category code transaction data which may include transaction data for the one or more merchant category codes that make up the one or more industries in which the target merchant operates.

At a block 20, one or more merchant consistency ratios may be calculated using the first dataset D1 and the second data set D2. At a block 22, an industry ratio for each of the one or more industries using the second dataset D2, and at block 24 a merchant category code (MCC) ratio for the one or more merchant category codes that comprise the one or more industries in which the target merchant operates may be calculated using the second dataset D2.

At a block 26, whether the target merchant exhibits MCC shift behavior in a second time period by comparing the one or more merchant consistency ratios to a first threshold, comparing each industry ratio to a second threshold, and comparing the MCC ratio to a third threshold. If, at a block 28, the one or more merchant consistency ratios are greater than the first threshold value, each industry ratio is less than the second threshold value, and the MCC ratio is greater than the third ratio, then MCC shift behavior may exist at a block 30. If MCC shift behavior may exist an alert may be sent for the target merchant at block 32. If, at a block 28, the one or more merchant consistency ratios are less than the first threshold value, any industry ratio is greater than or equal to the second threshold value, and the MCC ratio is less than the third ratio, then MCC shift behavior may not exist at a block 30 and the method ends.

Figure 2A:
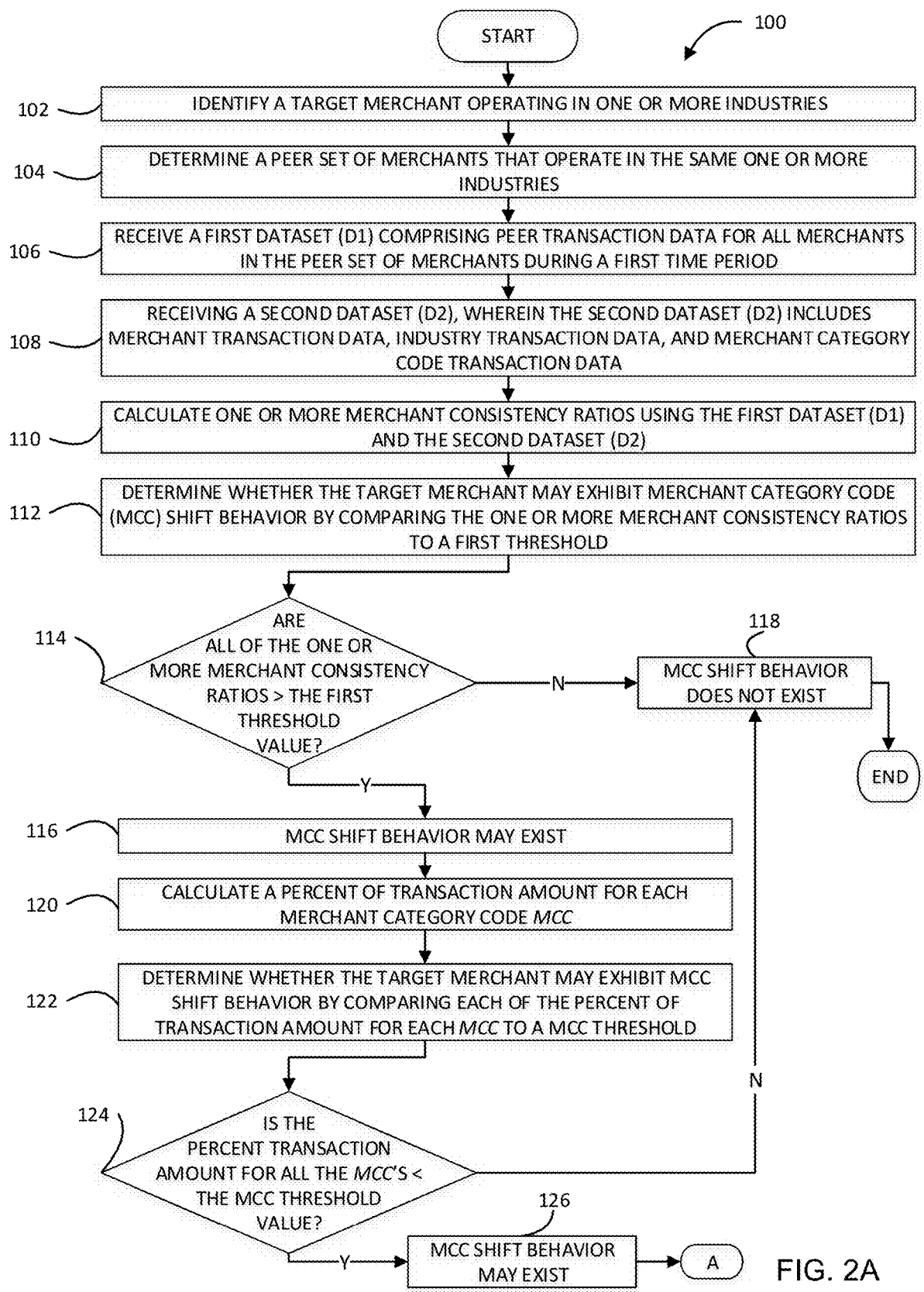
FIG. 2A is a flowchart of another embodiment of a method for detecting merchant category code shift behavior.
Figure 2B:
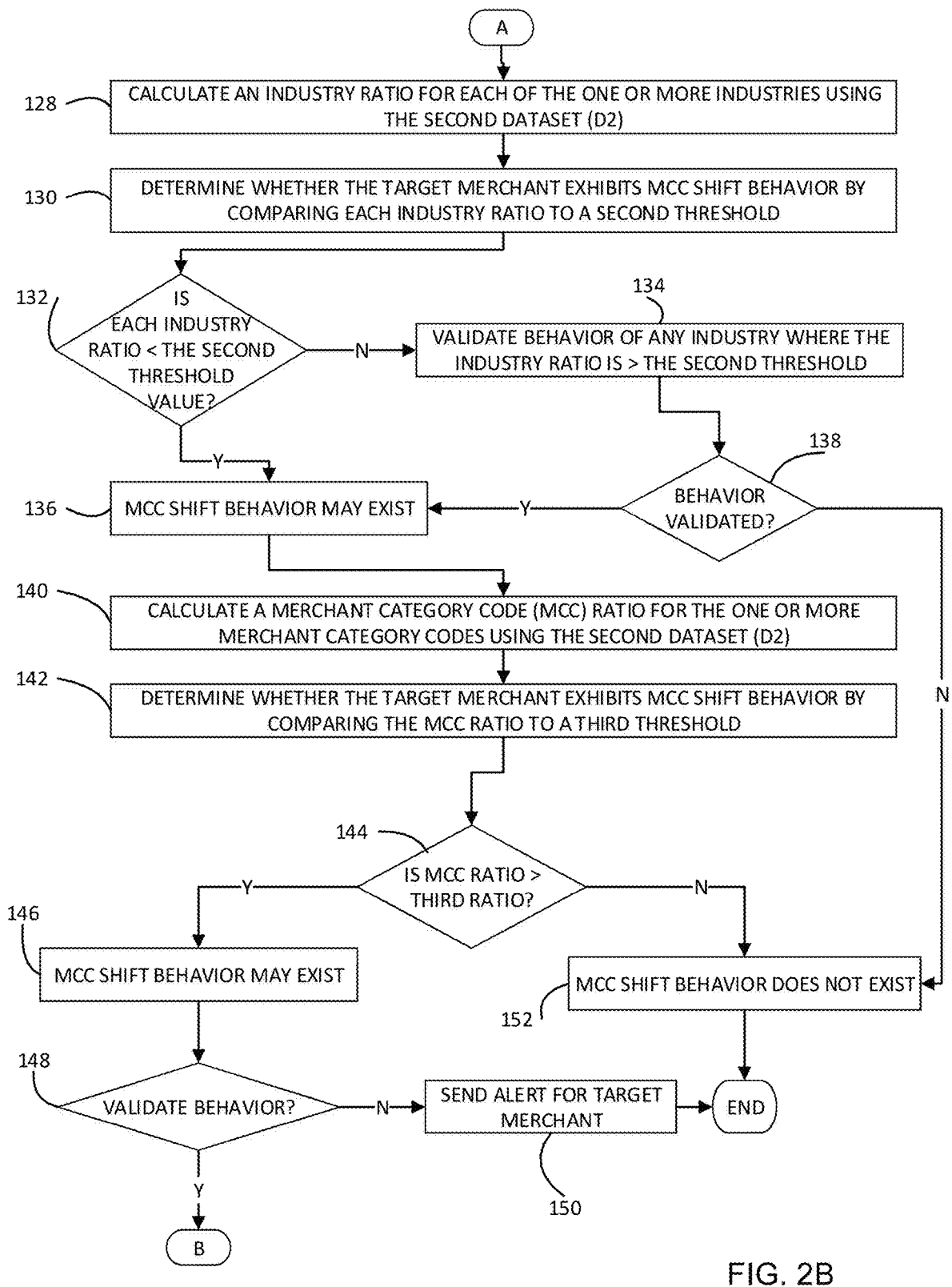
FIG. 2B is a continuation of the method for detecting merchant category code shift behavior of FIG. 2A.

FIGS. 2A and 2B generally illustrate another embodiment of a method 100 for determining whether a merchant is exhibiting MCC shift behavior. At a block 102, a target merchant operating in one or more industries (e.g., $ind_1$, $ind_2$, ... $ind_n$) may be identified. For example, the industries for the target merchant may include "retail" (e.g., $ind_1$) and "other" (e.g., $ind_2$). At a block 104, a peer set of merchants that operate in the same one or more industries (e.g., "retail" and "other") as the target merchant may be determined. A merchant may be identified as a target merchant if the merchant has consistent overall transaction volume during a time frame, but there are changes in the transaction volume distribution for the industries in which the merchant operates during the time frame.

At a block 106, a first dataset $D1_j$ may be received for each $ind_j$ (j=1 to n). The first dataset(s) $D1_j$ (collectively "D1") may include peer transaction data (e.g., transaction amount and volume) for all merchants in the peer set of merchants that operate in the one or more industries (e.g., $ind_1$, $ind_2$, ... $ind_n$) during a first time period. The peer transaction data may include overall industry transaction data for the peer set of merchants for each industry. The first time period may be, for example, a 6 month, 12 month, 18 month, or 24 month period of time, or any other period of time for which transaction amount is available for the peer set of merchants.

At a block 108, a second dataset D2 is received. The second dataset D2 may include merchant transaction data (e.g., transaction amount and volume) for the target merchant during the first time period. The merchant transaction data may include industry transaction data for the one or more industries in which the target merchant operates. The industry transaction data for the one or more industries may include merchant category code transaction data for one or more merchant category codes that comprise the industries in which the merchant operates. For example, the second dataset D2 may comprise transaction data aggregated at the industry level and the MCC level for the target merchant for each industry the target merchant operates in along with the overall transaction data month over month for the target merchant.

At a block 110, one or more merchant consistency ratios may be calculated to determine if the target merchant has consistent performance over time and with respect to industry to ensure that any possible MCC shift behavior is not influenced by some external factor. The one or more merchant consistency ratios may be calculated for the first and second datasets D1 and D2 as follows:

$$\text{Merchant Consistency Ratio} = \frac{\text{cov}(x, y)}{\sigma_x \sigma_y}$$

where x may be transaction volume during a baseline time period, y may be transaction volume during an observation time period, cov(x,y) may be the covariance of x and y, $\sigma_x$ may be the standard deviation of x, and $\sigma_y$ is the standard deviation of y. For example, for the first dataset D1, x and y may be the overall industry transaction volume for all of the industries in which the target merchant operates (e.g., $\text{ind}_1$, $\text{ind}_2$, . . . $\text{ind}_n$) during the baseline time period and observation time period, respectively, and for the second dataset D2, x and y may be the overall merchant transaction volume for the peer set of merchants during the baseline and the observation time periods, respectively.

The baseline time period may be, for example, a first 12 month period and the observation time period may be, for example, a second 12 month period of the first and second datasets D1 and D2. Alternatively, the baseline time period may be a first 3 month, 6 month, or 9 month period of time of the first and second datasets D1 and D2, or any other period of time for which transaction data is available for the target merchant and the peer set of merchants. Similarity, the observation time period may be a second 3 month, 6 month, or 9 month period of time of the first and second datasets D1 and D2, or any other period of time of the first and second datasets D1 and D2 for which transaction amount is available for the target merchant and the peer set of merchants.

At a block 112, whether the target merchant may be exhibiting MCC shift behavior may be determined by comparing the one or more merchant consistency ratios to a first threshold. The absolute value of the one or more merchant consistency ratios may be taken before they are compared to the first threshold. At a block 114, if the one or more merchant consistency ratios for D1 and D2 are all greater than a first threshold, then MCC shift behavior may exist at a block 116. Otherwise, if, at the block 114, any of the one or more merchant consistency ratios are below a first threshold then, MCC shift behavior does not exist at a block 118 and the method ends. The first threshold may be, for example, 0.5. Of course other threshold values are contemplated as long as the thresholds are sufficient to identify merchants that are exhibiting MCC shift behavior.

If MCC shift behavior may exist at the block 116, the method 100 may continue at a block 120. At the block 120, a percent of transaction amount coming from each merchant category code mcc for a third time period i may be determined using the second dataset D2. The percent of transaction amount may be calculated as follows:

$$\% \; PV_i(corp_{mcc_{pv}}) = \frac{PV_i(corp_{mcc_{pv}})}{PV_i(corp_{pv})}$$

where $PV_i(corp_{mcc_{pv}})$ may be a transaction amount for a merchant category code mcc for a third time period i, and $PV_i(corp_{pv})$ may be an overall transaction amount for the target merchant for the third time period i. The third time period i may be one month or any other time period that is less than the first time period.

At a block 122, the percent of transaction amount for each merchant category code mcc may be compared to a MCC threshold to determine whether the target merchant may be exhibiting MCC shift behavior. At a block 124, if the percent of transaction amount for any merchant category code mcc is greater than or equal to the MCC threshold for all time periods i (e.g., all months i), then the target merchant may not be demonstrating possible MCC shift behavior and the method ends. For example, if the MCC threshold is 98% and any of the merchant category codes have a percentage of transaction amount greater than 98%, then that means that 98-100% of the overall transaction amount for the target merchant is coming from one MCC, and thus MCC shift behavior is not occurring.

If the percent transaction amount is less than the MCC threshold for all merchant category codes mcc for all time periods i (e.g., all months i), then MCC shift behavior may exist at a block 126, and the method 100 may continue at a block "A" to FIG. 2B.

At a block 128, an industry ratio may be calculated for each of the one or more industries (e.g., $\text{ind}_1$, $\text{ind}_2$, . . . $\text{ind}_n$). The industry ratios for each of the one or more industries may be calculated using the second dataset D2 as follow:

$$\text{Industry Ratio} = \frac{\Delta PV(corp_{ind_{j_{pv}}})}{\Delta PV(corp_{pv})}$$

where $PV_i(corp_{ind_{j_{pv}}})$ may be transaction amount for an industry j for the third time period i for the target merchant and $PV_i(corp_{pv})$ may be overall transaction amount for the target merchant for the third time period i. The third time period i may be one month or any other time period that is less than the first time period.

Whether the target merchant is exhibiting MCC shift behavior may be determined at a block 130 by comparing each industry ratio to a second threshold. The absolute value of each industry ratio may be taken before it is compared to the second threshold. The second threshold value may be, for example, 1. Of course, other threshold values are contemplated as long as the thresholds are sufficient to identify merchants that are exhibiting MCC shift behavior.

At a block 132, if all the industry ratios are less than the second threshold value, then MCC shift behavior may exist at a block 136. If, at a block 132, any of the industry ratios during the third time period i are greater than the second threshold then the method may proceed to a block 134. At the block 134, the industry behavior for the industries in which the industry ratio was greater than 1 for the third time period i is further evaluated to ensure that the behavior observed is unique to the target merchant. At the block 134, the second dataset D2 is used to calculate the growth rate for the current year for the target merchant. In one embodiment, the industry behavior for the industries within target merchant are validated for the months in which the industry ratio was greater than 1. The growth rate for the current year is calculated by dividing the difference in the current time period's volume (e.g., current month's volume) for the target merchant and the same time period in the previous year's volume for the target merchant by the same time period in the previous year's volume for the target merchant. For example, if the target merchant operates in retail and the time period is one month, then in one embodiment the growth rate current year for the target merchant in "retail"= [(current month volume for target merchant in retail)−(same month previous year volume for target merchant in retail)]/ (same month previous year volume for target merchant in retail).

Once the growth rate for the current year for the target merchant for an industry is determined, it may be compared to a value u or l.

growth rate current year≥u or growth rate current year≤l where u=mean+σ, l=mean−σ, mean=average(growth rate of all peer merchants same time period previous year), and σ=variance(growth rate of all peer merchants same time period previous year). The growth rate of the peer merchants in one or more industries may be calculated using the first dataset D1. The purpose of calculating the growth rate for the peer merchants in the same time period previous year and in the same industry as the target merchant is to validate the target merchant's behavior in the particular industry. If the target merchant's behavior is not aligned with its peer merchants in a particular industry, then MCC behavior may exist. For example, if the target merchant operates in retail and the time period is a month, then in one embodiment, the growth rate for the peer merchants for the same month previous year in "retail"=[(current month volume for all peer merchants in retail)−(same month previous year volume for all peer merchants in retail)]/(same month previous year volume for all peer merchants in retail).

If the growth rate current year for the target merchant is greater than or equal to u or less than or equal to l, then the target merchant is behaving in a unique way and is not aligned with its peer merchants, thus MCC shift behavior may exist.

In addition, whether MCC shift behavior may exist may be determined by comparing the "sign" of the growth rate for the target merchant to the "sign" of the growth rate for the peer merchants, for example:

sign(growth rate of target merchant)==sign(growth rate of allpeer merchants).

Here, "sign" means the sign check (positive or negative) for the growth rate number. If the target merchant's growth rate's sign is either positive (e.g., showing increasing growth) or negative (e.g., demonstrating decreasing growth) and the peer merchant's growth rate is the opposite, then the merchant has possible MCC shift behavior. Thus, in order to determine whether a merchant has potential MCC shift behavior either the growth rate for the current year is ≥u or ≤l, and/or the sign(growth rate of target merchant)≠sign (growth rate of peer merchants).

At a block 138, if the industry behavior is validated, then MCC shift behavior may exist at a block 136. Otherwise, if the industry behavior is not validated at the block 138, then MCC shift behavior may not exist at a block 152.

If MCC shift behavior may exist at the block 136, then the method continues to a block 140. At the block 140, a merchant category code (MCC) ratio for the one or more merchant category codes may be calculated. The MCC ratio may signify that a change in MCC transaction volume is not influenced by a change in overall transaction volume of the target merchant, and therefore that the transaction volume has most likely been shifted from one MCC to another. The MCC ratio may be calculated using dataset D2 as follows:

$$MCC \text{ Ratio} = \frac{\Delta PV_i(corp_{mcc_{pv}})}{\Delta PV_i(corp_{pv})}$$

where $PV_i(corp_{mcc_{pv}})$ may be the target merchant's transaction amount for merchant category code mcc for a third time period i and $PV_i(corp_{pv})$ may be the overall transaction amount for the target merchant for the third time period i. As noted above, the third time period i may be one month or any other time period that is less than the first time period.

At a block 142, whether the target merchant exhibits MCC shift behavior in a second time period may be determined by comparing the MCC ratio to a third threshold. The absolute value of the MCC ratio may be taken before comparing it to the third threshold. The second time period may be one month, two months, three month, or any other time frame that is less than or equal to the first time period.

At a block 144, if the merchant category code ratio is greater than the third threshold value during the second time period, then the target merchant may be exhibiting MCC shift behavior and the method may proceed to a block 146. The third threshold value may be, for example, 1. Of course other threshold values are contemplated as long as the thresholds are sufficient to identify merchants that are exhibiting MCC shift behavior.

The method may proceed to block 148. At the block 148, whether the possible MCC shift behavior will be validated or not is determined. If validation of the behavior is not to be determined, then an alert for the target may be communicated at a block 150 before the method ends; or, the method may simply end. If the MCC shift behavior is to be validated then the method 100 continues to block "B" of FIG. 3. The alert that may be communicated may be an electronic communication or signal. The alert may be communicated or sent to the payment network informing them that possible MCC shift behavior is occurring for the target merchant.

If the merchant category code ratio is not greater than the third threshold value during the second time period, then the target merchant may not be exhibiting MCC shift behavior and the method may proceed to a block 152 and end.

Figure 3:
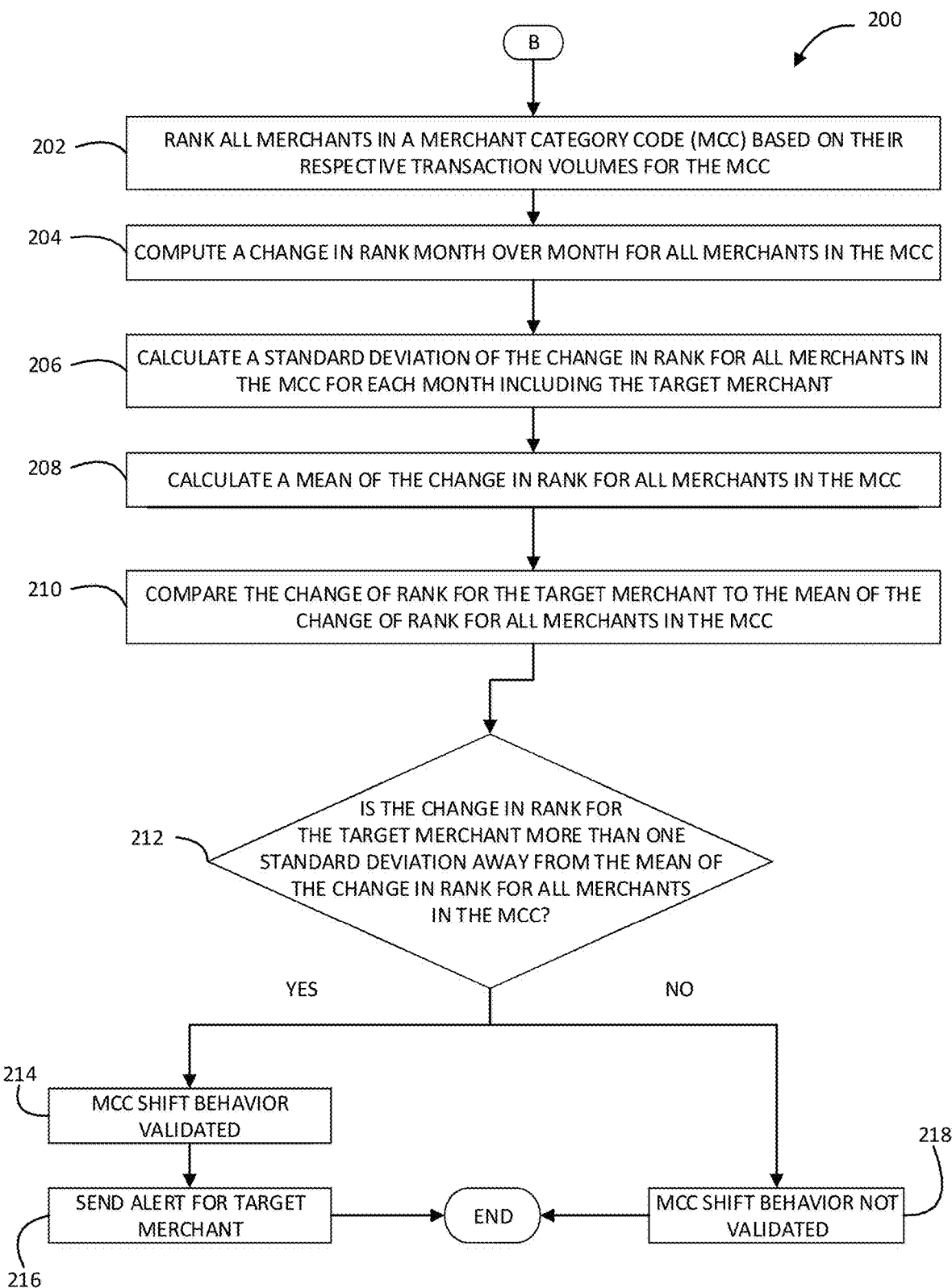
FIG. 3 is a flowchart of a method for validating the merchant category code shift behavior.

Turning to FIG. 3, a method 200 is disclosed. The method 200 generally illustrates a method of validating possible MCC shift behavior. The method 200 may be used to determine if the target merchant has outlier behavior in a MCC in the one or more industries for the second time period, for example, a month where the MCC ratio is greater than 1.

At a block 202, all merchants in a merchant category code may be ranked based on their respective transaction volumes for the MCC. All merchants in a MCC includes the target merchant and any merchant that operates in the MCC.

At a block 204, a change in rank month over month for the second time period (e.g., a month) for all the merchants in the MCC may be computed.

At a block 206, a standard deviation of the change in rank for all of the merchants in the MCC for each month including the target merchant may be calculated.

At a block 208, a mean of the change in rank for all the merchants in the MCC may be calculated.

At a block 210, the change in rank for the target merchant may be compared to the mean of the change of rank for all merchants in the MCC.

At a block 212, if the change in rank for the target merchant in the second time period is more than one standard deviation away from the mean of the change in rank for all the merchants, then the MCC shift behavior of the target merchant is validated at block 214. If the MCC shift is validated, then an alert may be communicated. The alert may be an electronic communication or signal. The alert may be communicated or sent to the payment network informing them that possible MCC shift behavior is occurring for the target merchant.

If the change in rank for the target merchant in the second time period is not more than one standard deviation away from the mean of the change in rank for all the merchants, then the merchant category code shift behavior of the target merchant is not validated at block 218 and the method ends.

In an example embodiment, an example target merchant may operate in the industries of "retail" (e.g., $ind_1$) and "other" (e.g., $ind_2$). The MCCs included in the "retail" industry for the example target merchant may be, for example: family clothing stores (e.g., MCC 5651), men's and women's clothing stores (e.g., MCC 5691), miscellaneous general merchandise (e.g., MCC 5399), miscellaneous and specialty retail stores (e.g., MCC 5999), and women's ready-to-wear stores (e.g., MCC 5621). The MCCs included in the "other" industry for the example target merchant may be, for example: business services—default (e.g., MCC 7399), catalog merchant—direct marketing (e.g., MCC 5964), and professional services—default (e.g., MCC 8999).

The overall transaction volume for the example target merchant may be consistent for a first time period comprising 24 months, for example, from July 2014 to June 2016. The first time period may be divided into two periods, for example, a first year comprising transaction data from July 2014-June 2015 and a second year comprising transaction data from July 2015-June 2016. As shown in Table 1 below, the overall transaction volume for the example target merchant may be consistent across the first and second years.

TABLE 1

|  | Year 1 (July 2014-June 2015) | Year 2 (July 2015-June 2016) |
| --- | --- | --- |
| Overall Transaction Volume for Example Target Merchant | 18,515,203,949 | 18,245,857,959.27 |

However, when the overall transaction volume distribution (%) is calculated across the two industries "retail" and "other" for the first and second years for the example target merchant (as shown in Table 2), it is evident that a change has occurred; and, MCC shift behavior may be the potential cause of the change.

TABLE 2

| Industry | Year 1 (July 2014-June 2015) | Year 2 (July 2015-June 2016) |
| --- | --- | --- |
| Retail | 77.94% | 94.43% |
| Other | 22.06% | 5.57% |

Figure 4A:
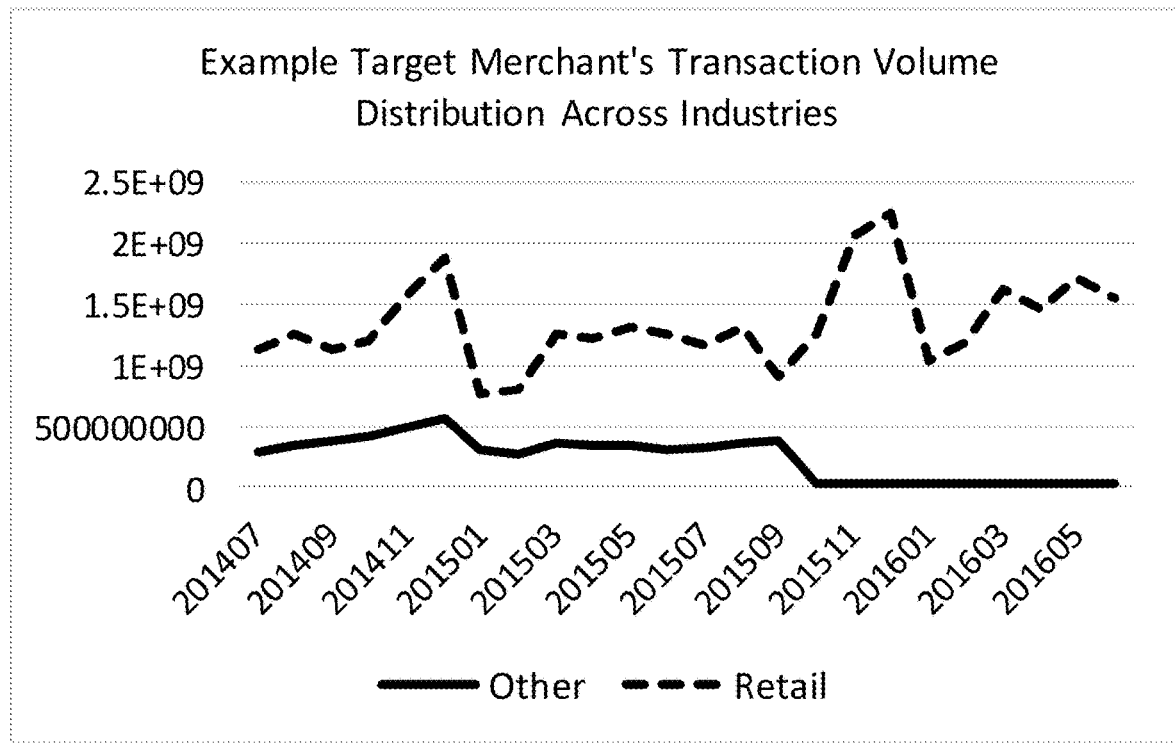
FIG. 4A is a graph of an example target merchant's transaction volume distribution across one or more industries.
Figure 4B:
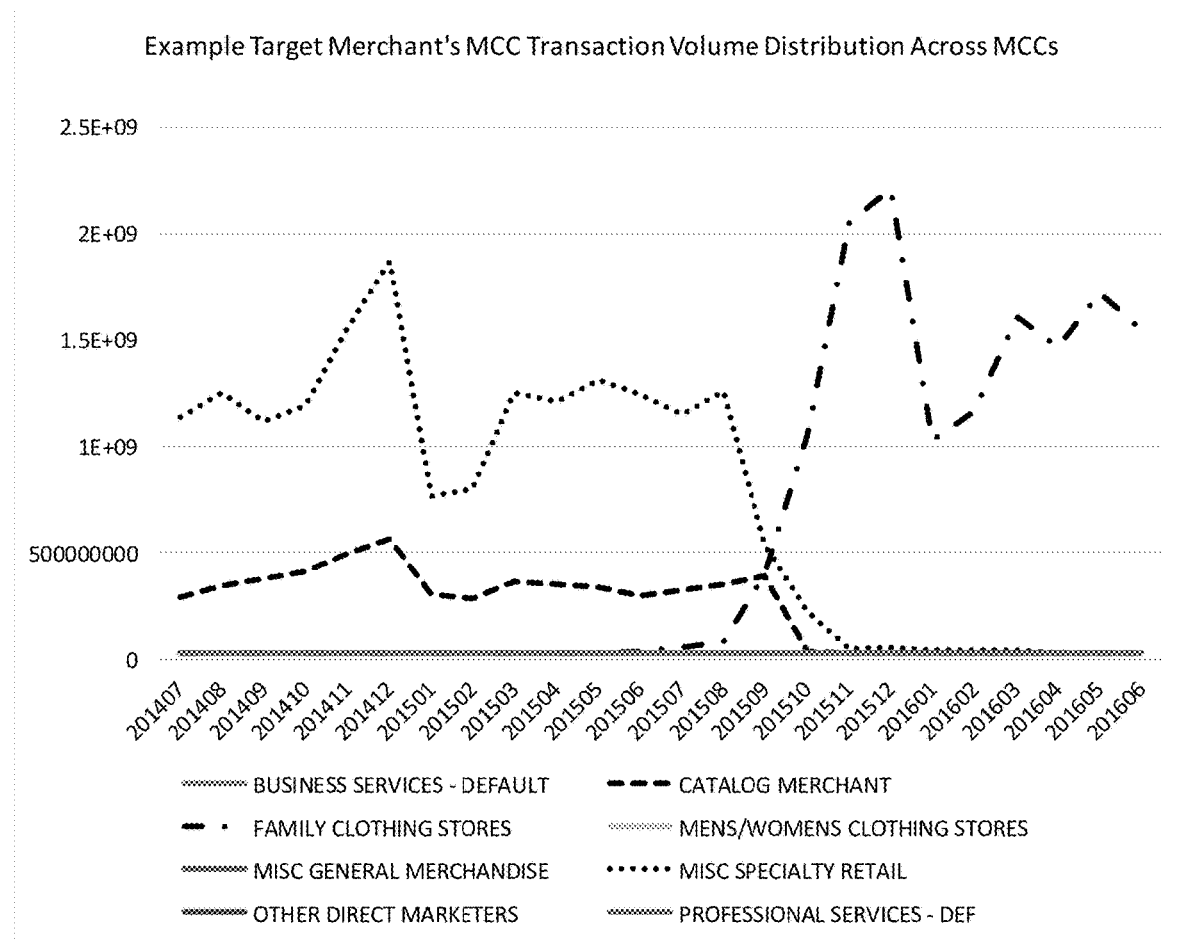
FIG. 4B is a graph of the example target merchant's MCC transaction volume distribution across MCC's for the one or more industries of FIG. 4A.

FIG. 4A shows the example target merchant's transaction volume distribution across the "retail" and "other" industries for the example first time period comprising a 24 month period of July 2014 to June 2016. From the graph, a change in the transaction volume for both the "retail" and "other" industries occurred in year 2 around the months of September 2015-November 2015. Digging a little deeper, FIG. 4B illustrates the example target merchant's transaction volume distribution across all the MCC's for both the "retail" and "other" industries. Here, most of the MCC's had little or no change but the MCCs for family clothing stores, catalog merchant, and miscellaneous specialty retail all had significant changes in year 2 around the months of September 2015-October 2015. The graphs further demonstrate that MCC shift behavior may be occurring.

Once the example target merchant is identified as possibly exhibiting MCC shift behavior, a peer set of merchants that operate in the industries of "retail" and "other" may be determined. Once the peer set of merchants is identified, a first dataset D1 for each industry $ind_j$ is prepared. For example, a first dataset $D1_1$ for "retail" and a first dataset $D1_2$ for "other" are prepared (collectively forming a first dataset D1). The first dataset D1 may include peer transaction amount for each of the merchants in the peer set of merchants during a first time period. In the example embodiment, the first time period may be 24 months and comprise peer transaction data from July 2014 to June 2016, for example.

A second dataset D2 may also be prepared for the first time period (here the same 24 month period, e.g., July 2014 to June 2016. The second dataset D2 may comprise transaction amount aggregated at the industry level and the MCC level for the example target merchant along with the overall transaction amount month over month for the example target merchant. For example, the second dataset D2 may comprise transaction amount for family clothing stores (MCC 5651), men's and women's clothing stores (MCC 5691), miscellaneous general merchandise (MCC 5399), miscellaneous and specialty retail stores (MCC 5999), and women's ready-to-wear stores (MCC 5621) as well as business services—default (MCC 7399), catalog merchant—direct marketing (MCC 5964), and professional services—default (MCC 8999).

Once the first and second datasets D1 and D2 are prepared, the overall merchant transaction volume from the second dataset D2 and the overall industry transaction volume from the first datasets D1 may be used to determine whether the merchant has consistent performance in a baseline time period x and an observation time period y. To determine whether the merchant has consistent performance, one or more merchant consistency ratios may be calculated as discussed above and compared to a first threshold value, for example, 0.5. In the present example embodiment, if the first time period is 24 months (e.g., July 2014 to June 2016), then baseline time period is the first year (e.g., July 2014-June 2015) and the observation time period is the second year (e.g., July 2015-June 2016). The merchant consistency ratios for the example target merchant may be as follows.

TABLE 3

| Dataset | Merchant Consistency Ratio |
| --- | --- |
| D1 - Overall Industry Transaction Volume (baseline time period) | 0.767 |

TABLE 3-continued

| Dataset | Merchant Consistency Ratio |
| --- | --- |
| D2 - Overall Merchant Transaction Volume (observation time period) | 0.730 |
| D2 - Overall Merchant Transaction Volume | 0.928 |

Since the merchant consistency ratios for both the first and second datasets D1 and D2 are greater than the first threshold value of 0.5, then the target merchant may be demonstrating MCC shift behavior.

Next, the percent transaction amount coming from each MCC for each month may be calculated using the second dataset to ensure that most of the transaction volume is not coming from a single MCC. The percent transaction amount may then be compared to a MCC threshold, for example 98%. If the percent transaction amount is below the MCC threshold then the target merchant may be exhibiting MCC shift behavior. In the present example, the percent transaction amount for the example target merchant may be 92.8%, which is less than 98%. Thus, MCC shift behavior may exist.

If it is determined that MCC shift behavior may exist, than an industry ratio for each industry, "retail" and "other", is calculated using the industry ratio equation discussed above. Here, the third time period i is 1 month. Thus, the industry ratio for each month is calculated and compared to the second threshold value of 1, for example. The example target merchant may have the industry ratios shown in Table 4 at the third time period i.

TABLE 4

| Date | Industry | Industry Ratio |
| --- | --- | --- |
| Setember 2015 | retail | −1.1 |
| October 2015 | retail | 30.7 |
| October 2015 | other | −31.7 |

Here, since "retail" and "other" had an industry ratio greater than 1 in months September 2015 and October 2015 then the industry behavior needs to be validated.

Using the growth rate equations described above, the industry behavior is checked. The growth rate calculations for the example target merchant may be those shown in Table 5:

TABLE 5 retail sign check: 1.0
other sign check: −1.0
retail growth rate threshold
 range −0.06024048855132226 0.14854714439271338
Growth rate retail: −0.313705901554987

TABLE 5-continued other growth rate threshold
 range −0.07012894460126076 0.16712892274938673
Growth rate other: 0.10457457567371976

Here, the "other" sign check is −1, which means that the target merchant's behavior is different than the peer merchants in the "other" industry. Additional, the "retail" growth rate is less than a threshold value of 1, which again shows that the merchant's behavior is different from the peer merchants in the "retail" industry and the retail sign is +1, the behavior observed is unique to the example target merchant. Thus, the example target merchant may be exhibiting MCC shift behavior.

Next, the MCC ratios are determined for each month using the equation above. The MCC ratios are compared to the third threshold. For any month, where the MCC ratio is greater than or equal to 1, then MCC shift behavior may be occurring. Table 6 shows the MCC ratios for the example target merchant that are greater than the third threshold.

TABLE 6

| Date | MCC | Ratio |
| --- | --- | --- |
| 2015 September | MISC SPECIALTY RETAIL | −1.900 |
| 2015 October | CATALOG MERCHANT | −31.700 |
| 2015 October | FAMILY CLOTHING STORES | 59.400 |
| 2015 October | MISC SPECIALTY RETAIL | −28.700 |
| 2015 November | FAMILY CLOTHING STORES | 1.200 |

To validate whether the MCCs are actually having a MCC shift, all the merchants in the MCC are ranked based on MCC transaction volume. The change in rank month over month is then computed as well as the standard deviation of the rank change for each month. For example, the example target merchant may have the rankings, rank changes and standard deviations shown in Table 7 for month October 2015.

TABLE 7

| MCC | Date | rank | rank_change | score | std_dev_of_rank_chg | no_of_std_dev |
| --- | --- | --- | --- | --- | --- | --- |
| CATALOG MERCHANT | 2015 October | 29 | 28 | 5.466 | 8.997 | 3.112 |
| FAMILY CLOTHING STORES | 2015 October | 1 | −7 | −3.119 | 4.434 | −1.579 |
| MISC SPECIALTY RETAIL | 2015 October | 5 | 1 | 0.053 | 48.543 | 0.021 |

Here both the MCC for catalog merchant and family clothing stores have standard deviations that are more than one standard deviation away from the mean of the industry's rank change. Therefore, MCC shift behavior for the example target merchant is validated.

The detection of MCC shift behavior is beneficial as it enables payment networks to safeguard against the loss of revenue from foregone interchange fees by first detecting and then send an alert with MCC shift behavior has been detected. The disclosed solution also enables payment networks to accurately track and reward consumers for purchases made to specific MCCs. In addition, detecting MCC shift behavior is beneficial to assist in correctly classifying merchants for tax and other regulatory purposes. Further, the solution disclosed helps identify MCC shift behavior so that action can be taken against acquires who may be improperly classifying their merchants to gain a competitive edge. Further, the detection of MCC shift behavior, enables payment networks to assess and understand the stability of MCCs so that MCCs that are no longer relevant can be phased out or modified so that the current number and grouping of services and goods under MCCs makes sense.

The methods, systems, and apparatuses described herein for the detection of merchant category shift behavior may be used to determine shifts in consumer behavior if overall sales remain the same. The proposed model may be used to detect a shift in behavior of the existing customer base for a given business when it launches a new products, services, or mode of payment. In this cases the sale remains more or less the same, but there may be a shift in the product/service purchased or mode of payment used. For example, a mobile company may launch a new version of a cellphone. The model disclosed herein may be used to detect if customers are choosing the new cellphone over the prior model even though overall sales remain the same. In another example, a direct-to-home (DTH) service provider launches a new recharge pack. The model can be used to detect if the customers are shifting to the new recharge pack or not.

The methods, systems, and apparatuses described herein for the detection of merchant category shift behavior may also be used to generate an alert when a component in a system fails even though the overall flow or output of the system remains unchanged. For example, in a network system, when a load balancer fails, the load in one of the servers increases with overall load being the same, as the balancer is unable to distribute the load evenly across servers. In this case, the model can generate an alert as soon as the load in one server increases more than usual along with decrease in load in some other server.

Furthermore, the methods, systems, and apparatuses described herein for the detection of merchant category shift behavior may also be used to help analytics team to minimize outliers while doing peer benchmarking, e.g., peers depicting outlier behavior can be removed from peer set so as to exhibit correct representation of the respective industry.

Figure 5:
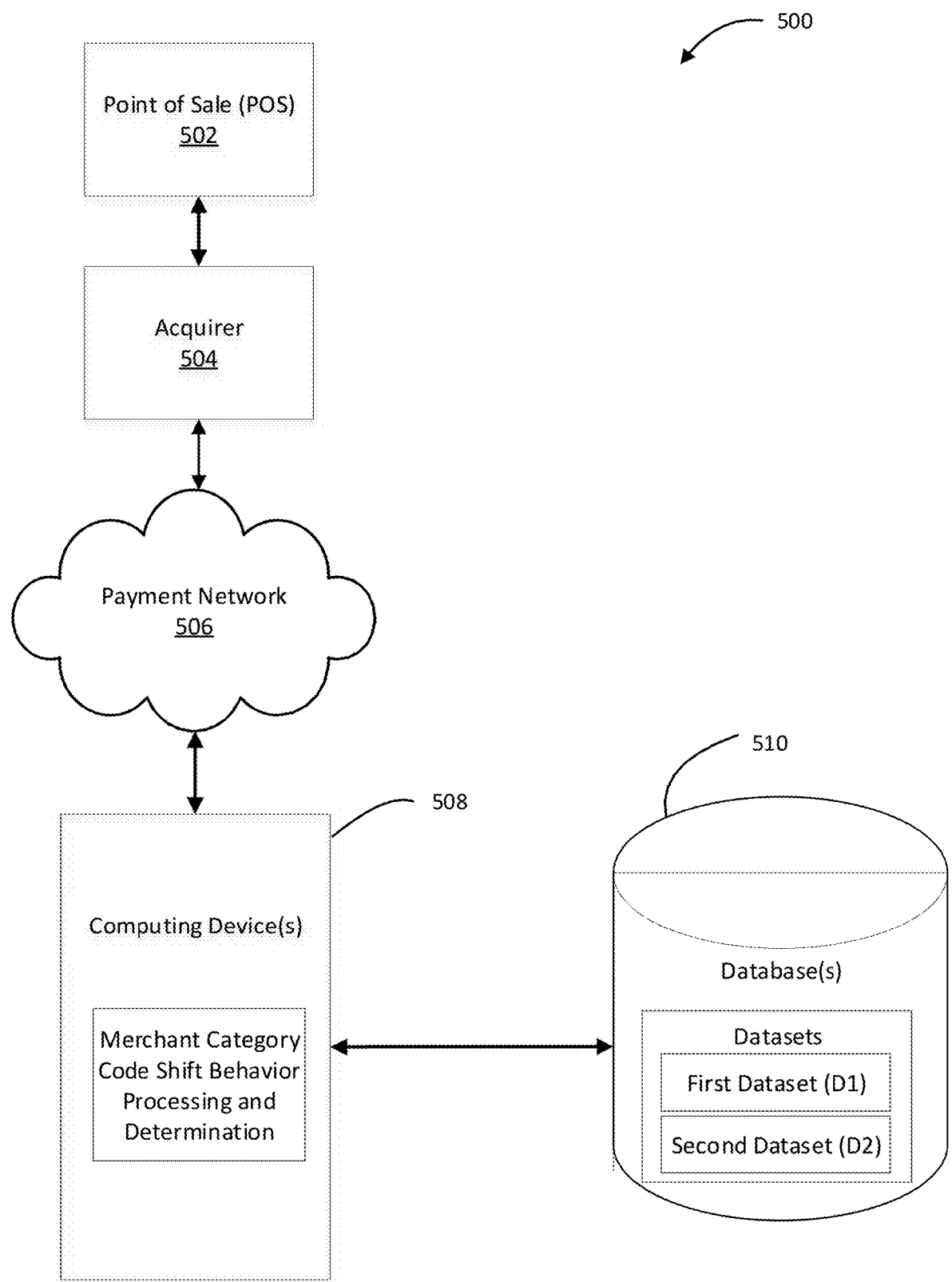
FIG. 5 is a schematic illustration of elements of an example electronic transaction processing system; and, FIG. 6 is a block diagram of system components of a computing device in accordance with the present disclosure.

FIG. 5 is a high level schematic illustration of an electronic transaction processing system 500. The electronic transaction processing system may include one or more points of sale (POS) 502. When one or more consumers are ready to purchase their goods or services, they may be presented with the option to make a credit or debit PIN transaction at the POS 502. Depending on the type of transaction selected (debit or credit), transaction data including the transaction amount, card number, expiration date, and other information is sent to an acquirer 506 that in turn sends the information to a payment network 506. The payment network 506 handles the processing of the transaction and may be, for example, STAR®, Pulse®, NYCE®, MAC®, MasterCard's Maestro® and Visa's Interlink®. The payment network 506 may also send the transaction data to one or more computing devices 508, which may store the transaction data, e.g., datasets D1 and D2, in a database 510.

Figure 6:
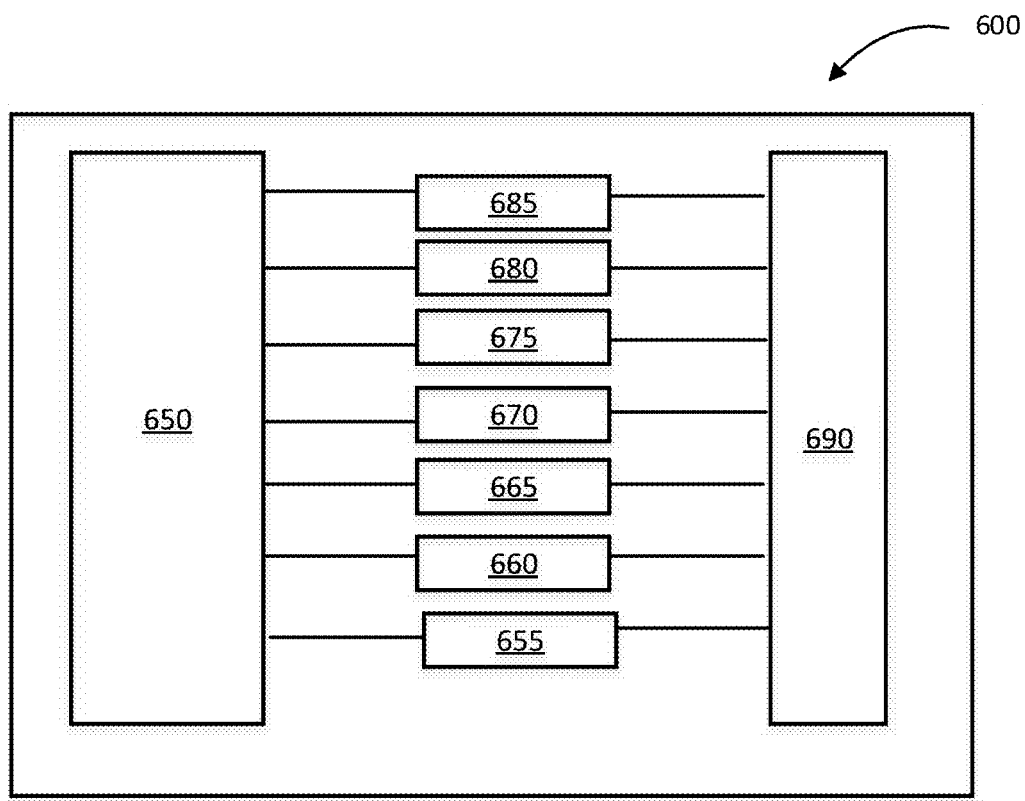

FIG. 6 may be an example computing device 600. The computing device 600 may be physically configured to interact or communicate with other computing devices via a communication network. The computing device 600 may have a processor 650 that is physically configured according to computer executable instructions. The computing device 600 may have a power supply 655 such as a battery which may be rechargeable. The computing device 600 may also have a sound and video module 660 which assists in displaying video and sound and may turn off when not in use to conserve power and battery life. The computing device 600 may also have volatile memory 665 and non-volatile memory 670 as well as internal storage 675 or external storage. The computing device 600 may have an input/output bus 690 that shuttles data to and from various user input devices such as a keyboard, mouse, speakers, or other inputs. It also may control communicating with other computing devices and system components, either through wireless or wired devices. Of course, this is just one embodiment of the computing device 600 and the number and types of computing devices 600 is limited only by the imagination.

In accordance with the provisions of the patent statutes and jurisprudence, exemplary configurations described above are considered to represent one embodiment of the disclosure. However, it should be noted that the teachings of the disclosure can be practiced otherwise than as specifically illustrated and described without departing from its spirit or scope.

The computing devices, computers, and servers described herein may be computers that may have, among other elements, a microprocessor (such as from the Intel Corporation, AMD or Motorola); volatile and non-volatile memory; one or more mass storage devices (e.g., a hard drive); various user input devices, such as a mouse, a keyboard, or a microphone; and a video display system. The user computing devices, computers, and servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The computing devices, computers, and servers described herein may communicate via communications networks, including the Internet, WAN, LAN, Wi-Fi, cellular, or other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

Further, the figures depict exemplary embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:
1. A computer-implemented method for:
identifying, via one or more processors, a target merchant operating in one or more industries;
determining, via the one or more processors, a peer set of merchants that operate in the same one or more industries as the target merchant;
receiving, over a payment network, a first dataset D1 stored in a database, wherein the first dataset D1 comprises peer transaction data for all merchants in the peer set of merchants that operate in the one or more industries during a first time period;
receiving, over the payment network, a second dataset D2 stored in the database, wherein the second dataset D2 comprises merchant transaction data for the target merchant during the first time period, wherein the merchant transaction data includes industry transaction data for the one or more industries in which the target merchant operates, and wherein the industry transaction data for the one or more industries is comprised of merchant category code transaction data for one or more merchant category codes that comprise the one or more industries;
calculating, via the one or more processors, one or more merchant consistency ratios using the first dataset D1 and the second dataset D2, wherein the merchant consistency ratios are calculated as follows:

$$\text{Merchant Consistency Ratio} = \frac{\text{cov}(x, y)}{\sigma_x \sigma_y}$$

wherein x is transaction volume during a baseline time period and y is transaction volume during an observation time period, and cov(x,y) is the covariance of x and y, $\sigma_x$ is the standard deviation of x, and $\sigma_y$ is the standard deviation of y;

calculating, via the one or more processors, an industry ratio for each of the one or more industries using the second dataset D2;

calculating, via the one or more processors, a merchant category code ratio for the one or more merchant category codes using the second dataset D2, wherein the merchant category code ratio is calculated as follows:

$$MCC\ Ratio = \frac{\Delta PV_i(corp_{mcc_{pv}})}{\Delta PV_i(corp_{pv})}$$

wherein $PV_i(corp_{mcc_{pv}})$ is the target merchant's transaction amount for merchant category code mcc for a third time period i, and wherein $PV_i(corp_{pv})$ is overall transaction amount for the target merchant for the third time period i;

determining, via the one or more processors, whether the target merchant exhibits merchant category code shift behavior comprising:
comparing the one or more merchant consistency ratios to a first threshold value,
comparing each industry ratio to a second threshold value, and
comparing the merchant category code ratio to a third threshold value;

in response to determining the target merchant exhibits merchant category code shift behavior, communicating, over the payment network, an alert that the target merchant is exhibiting merchant category code shift behavior.

2. The method of claim 1, wherein the first time period is 24 months.

3. The method of claim 1, wherein merchant category code shift behavior exists in a second time period if the one or more merchant consistency ratios are greater than the first threshold value, the industry ratio is less than or equal to the second threshold value, and the merchant category code ratio is greater than the third threshold value during the second time period.

4. The method of claim 3, wherein the second time period is one month.

5. The method of claim 4, further comprising:
ranking all merchants in a merchant category code based on transaction volume for the merchant category code, wherein all merchants includes the target merchant and any merchant that operates in the merchant category code;
computing a change in rank month over month for all the merchants in the merchant category code;
calculating a standard deviation of the change in rank for all of the merchants in the merchant category code for each month including the target merchant; and,
calculating a mean of the change in rank for all the merchants in the merchant category code;
wherein, for the second time period, if the change in rank for the target merchant is more than one standard deviation away from the mean of the change in rank for all the merchants, then the merchant category code shift behavior of the target merchant is validated.

6. The method of claim 3, wherein the first threshold value is 0.5.

7. The method of claim 3, wherein the second threshold value is 1.

8. The method of claim 3, wherein the third threshold value is 1.

9. The method of claim 1, wherein the baseline time period is for a first 12 month period and the observation time period is for a second 12 month period.

10. The method of claim 9, wherein the baseline time period and the observation time period are both determined using the second dataset D2.

11. The method of claim 1, wherein the one or more industry ratios are calculated as follows:

$$Industry\ Ratio = \frac{\Delta PV(corp_{ind_{j_{pv}}})}{\Delta PV(corp_{pv})}$$

wherein $PV_i(corp_{ind_{j_{pv}}})$ is transaction amount for an industry j for a third time period i for the target merchant, and wherein $PV_i(corp_{pv})$ is overall transaction amount for the target merchant for the third time period i.

12. The method of claim 11, wherein the third time period i is one month.

13. The method of claim 1, wherein the third time period i is one month.

14. A computer-implemented system comprising:
a payment network;
a processor in communication with the payment network; and
a memory in communication with the processor and storing processor-issuable instructions to:
identify a target merchant operating in one or more industries;
determine a peer set of merchants that operate in the same one or more industries as the target merchant;
receive a first dataset D1 stored in a database from the payment network, wherein the first dataset D1 comprises peer transaction data for all merchants in the peer set of merchants that operate in the one or more industries during a first time period;
receive a second dataset D2 stored in the database from the payment network, wherein the second dataset D2 comprises merchant transaction data for the target merchant during the first time period, wherein the merchant transaction data includes industry transaction data for the one or more industries in which the target merchant operates, and wherein the industry transaction data for the one or more industries is comprised of merchant category code transaction data for one or more merchant category codes;
calculate one or more merchant consistency ratios using the first dataset D1 and the second dataset D2, wherein the merchant consistency ratios are calculated as follows:

$$Merchant\ Consistency\ Ratio = \frac{cov(x, y)}{\sigma_x \sigma_y}$$

wherein x is transaction volume during a baseline time period and y is transaction volume during an observation time period, and cov(x,y) is the covariance of x and y, $\sigma_x$ is the standard deviation of x, and $\sigma_y$ is the standard deviation of y;
calculate an industry ratio for each of the one or more industries using the second dataset D2;

calculate a merchant category code ratio for the one or more merchant category codes using the second dataset D2, wherein the merchant category code ratio is calculated as follows:

$$MCC\ Ratio = \frac{\Delta PV_i(corp_{mcc_{pv}})}{\Delta PV_i(corp_{pv})}$$

wherein $PV_i$ ($corp_{mcc_{pv}}$) is the target merchant's transaction amount for merchant category code mcc for a third time period i, and wherein $PV_i(corp_{pv})$ is overall transaction amount for the target merchant for the third time period i;

determine whether the target merchant exhibits merchant category code shift behavior comprising:
  compare the one or more merchant consistency ratios to a first threshold value,
  compare each industry ratio to a second threshold value, and
  compare the merchant category code ratio to a third threshold value;

in response to determining the target merchant exhibits merchant category code shift behavior, communicate to the payment network an alert that the target merchant is exhibiting merchant category code shift behavior.

15. The system of claim 14, wherein the first time period is 24 months.

16. The system of claim 14, wherein merchant category code shift behavior exists in a second time period if the one or more merchant consistency ratios are greater than the first threshold value, the industry ratio is less than or equal to the second threshold value, and the merchant category code ratio is greater than the third threshold value during the second time period.

17. The system of claim 16, wherein the second time period is one month.

18. The system of claim 16, wherein the first threshold value is 0.5, the second threshold value is 1, and the third threshold value is 1.

19. The system of claim 14, wherein the baseline time period is for a first 12 month period and the observation time period is for a second 12 month period.

* * * * *